United States Patent
Lee et al.

(10) Patent No.: US 9,103,905 B2
(45) Date of Patent: Aug. 11, 2015

(54) SONAR SYSTEM AND IMPEDANCE MATCHING METHOD THEREOF

(71) Applicants: Jeong Min Lee, Gyeongsangnam-Do (KR); Byung Hwa Lee, Gyeongsangbuk-Do (KR)

(72) Inventors: Jeong Min Lee, Gyeongsangnam-Do (KR); Byung Hwa Lee, Gyeongsangbuk-Do (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 155 days.

(21) Appl. No.: 13/712,169

(22) Filed: Dec. 12, 2012

(65) Prior Publication Data

US 2014/0160892 A1 Jun. 12, 2014

(51) Int. Cl.
*G01S 15/00* (2006.01)
*G01S 15/02* (2006.01)
*G01S 7/524* (2006.01)
*B06B 1/02* (2006.01)
*G01V 1/04* (2006.01)

(52) U.S. Cl.
CPC .............. *G01S 15/02* (2013.01); *B06B 1/0215* (2013.01); *G01S 7/524* (2013.01); *G01V 1/04* (2013.01)

(58) Field of Classification Search
USPC .................................................... 367/99, 152
See application file for complete search history.

(56) References Cited

U.S. PATENT DOCUMENTS

| | | | | |
|---|---|---|---|---|
| 4,452,084 A * | 6/1984 | Taenzer | ........................... | 73/609 |
| 4,779,020 A * | 10/1988 | Konno et al. | .................. | 310/325 |
| 5,438,998 A * | 8/1995 | Hanafy | ........................... | 600/459 |
| 5,638,822 A * | 6/1997 | Seyed-Bolorforosh et al. | .............................. | 600/459 |
| 5,962,790 A * | 10/1999 | Lynnworth et al. | .............. | 73/644 |
| 5,987,992 A * | 11/1999 | Watanabe et al. | ............... | 73/632 |
| 6,050,361 A * | 4/2000 | Ruffa et al. | .................. | 181/108 |
| 6,109,109 A * | 8/2000 | Brown | ........................... | 73/632 |
| 6,234,021 B1 * | 5/2001 | Piety et al. | .................... | 73/592 |
| 6,343,511 B1 * | 2/2002 | Lynnworth et al. | .............. | 73/644 |
| 6,645,150 B2 * | 11/2003 | Angelsen et al. | .............. | 600/459 |
| 7,391,872 B2 * | 6/2008 | Pompei | ........................ | 381/111 |
| 7,905,323 B2 * | 3/2011 | Larsen | ........................... | 181/287 |
| 2001/0007591 A1 * | 7/2001 | Pompei | ........................ | 381/111 |
| 2002/0156379 A1 * | 10/2002 | Angelsen et al. | .............. | 600/459 |
| 2007/0140518 A1 * | 6/2007 | Larsen | ........................... | 381/354 |
| 2008/0285777 A1 * | 11/2008 | Pompei | ........................ | 381/116 |
| 2012/0157853 A1 * | 6/2012 | Gelly et al. | .................... | 600/459 |

* cited by examiner

*Primary Examiner* — James Hulka
(74) *Attorney, Agent, or Firm* — Scully, Scott, Murphy & Presser, P.C.

(57) ABSTRACT

This specification relates to an active SONAR system comprising a transmitter, a transducer and an impedance matching circuit for expanding bandwidth and increasing a power factor value in sound and ultrasonic wave bands by mutually matching resonant frequencies of the transducer and the impedance matching circuit or a resonant frequency between the transducer and the impedance matching circuit using an electrical equivalent model corresponding to actual impedance data of the transducer and controlling the positions and the intervals of the frequencies at which reactance components of the transducer including the impedance matching circuit become zero, and an impedance matching method thereof. This allows for efficient driving in a broadband between the transmitter and the transducer in the active SONAR system, contributing to output power performance and detection performance of the active SONAR system.

4 Claims, 7 Drawing Sheets

SONAR SYSTEM AND IMPEDANCE MATCHING METHOD THEREOF

BACKGROUND OF THE INVENTION

1. Field of the Invention

This specification relates to an active Sound Navigation and Ranging (SONAR) system and an impedance matching method thereof, and particularly, to an active SONAR system having an impedance matching circuit for driving underwater acoustic transducers in broadband and with high efficiency and the impedance matching method thereof, capable of obtaining matching circuit element values by controlling the positions and the intervals of the frequencies at which reactance components of a transducer become zero.

2. Background of the Invention

A radar, laser or infrared rays using electric waves are used to detect a target on land or in the air, but Sound Navigation and Ranging (SONAR) using acoustic waves is used to detect a target under the water. Active SONAR is essential acoustic equipment for a ship, which allows for safe sailings and serves to find an underwater (submarine) object which poses a threat to the ship. An operating principle of the active SONAR is to use a piezoelectric effect. When the current in a predetermined frequency flows on piezoelectric crystal or ceramic, the crystal or ceramic vibrates to generate acoustic waves of the same frequency. On the contrary, when external acoustic waves are received by the crystal or ceramic in the active SONAR, they generate electric energy. Frequency elements of the acoustic waves may be found through analysis for the electric energy. The equipment which can transmit or receive the acoustic waves is called 'active SONAR.'

In order to efficiently supply maximum power at a broadband from a transmitter to a transducer as a load in the active sonar system, an impedance matching function corresponding to electric interfacing between the transmitter and the transducer is essentially required. However, most of conventional impedance matching methods are subject to a limitation of maximum efficiency up to 50% due to performing a conjugate impedance matching for transmission of maximum power to the load. Especially, these methods are not so useful to be applied to the active sonar system, which exhibits very low output impedance of its transmitter and operates within a limited range of supplied power.

Hence, in order to allow the output power in high efficiency to be taken from the transmitter, an impedance matching method, which is capable of minimizing unnecessary reactive power components by attenuating only imaginary components for the impedance of the transducer as the load, may be considered.

However, an electrical characteristic of the transducer matched by such method exhibits large deviations for an input impedance and supplied power even within the matched frequency range. Also, the deviations depend on physical characteristics of the transducer, that the control by the matching method is difficult. To solve those problems, an impedance matching method using a filter network synthesis is applied to an estimated electrical equivalent model of the transducer. However, the physically fixed parameters of the transducer cause a constraint to an impedance matching bandwidth for minimizing a reactance component, required for high efficiency operation.

SUMMARY OF THE INVENTION

Therefore, to overcome the shortcomings of the related art, an aspect of the detailed description is to provide a sonar system having an impedance matching circuit with an extended bandwidth and an increased power factor value, in constructing an impedance matching circuit from an electrical equivalent model corresponding to actual impedance data of a transducer.

Also, another aspect of the detailed description is to provide an impedance matching method, capable of obtaining matching circuit element values by controlling the positions and the intervals of the frequencies at which the reactance components of the transducer become zero for improvement of bandwidth and power factor characteristic, and also capable of controlling a driving voltage for the a transducer, minimizing leakage current and reducing physical sizes of constituent components.

To achieve these and other advantages and the purpose of this specification, as embodied and broadly described herein, there is provided an active Sound Navigation and Ranging (SONAR) system including a transmitter modeled as an input power source and an input impedance, a transducer configured to convert an electrical signal of the transmitter into an acoustic wave or the acoustic wave into the electrical signal, and an impedance matching circuit located between the transmitter and the transducer and configured to transfer power from the transmitter to the transducer in high efficiency, wherein the transducer and the impedance matching circuit expand a bandwidth and increase a power factor value in acoustic and ultrasonic wave bands by mutually matching resonant frequencies of the transducer and the impedance matching circuit or a resonant frequency between the transducer and the impedance matching circuit using an electrical equivalent model corresponding to actual impedance data of the transducer, and controlling the positions and the intervals of the frequencies at which reactance components of the transducer including the impedance matching circuit become zero.

Also, in accordance with one exemplary embodiment of the detailed description, there is provided an impedance matching method for an active Sound Navigation and Ranging (SONAR) system including a transmitter modeled as an input power source and an input impedance, a transducer configured to convert an electrical signal of the transmitter into an acoustic wave or the acoustic wave into the electrical signal, wherein bandwidth and power factor characteristics may be enhanced in acoustic and ultrasonic wave bands by mutually matching resonant frequencies of the transducer and the impedance matching circuit or a resonant frequency between the transducer and the impedance matching circuit using an electrical equivalent model corresponding to actual impedance data of the transducer and controlling the positions and the intervals of the frequencies at which the reactance components of the transducer including the impedance matching circuit become zero, so as to transmit the power of the transmitter to the transducer in high efficiency.

The transducer may be modeled as an electrical equivalent model that a capacitor indicating an electrical characteristic of the transducer and the lumped-element circuits having N stages indicating mechanical and acoustic characteristics of the transducer are connected in parallel to each other.

The transducer may be approximated into an equivalent model for a single resonant mode within a frequency section desired to match when the transducer has multi-modes.

The impedance matching circuit may include an LC resonant circuit having a transformer, which includes a primary and a secondary terminal to increase or decrease the secondary terminal voltage with respect to the primary terminal voltage.

The impedance matching circuit may include a second resonant part having a resonant frequency between a secondary terminal inductor of the transformer and a capacitor of the transducer, the capacitor being connected to the secondary terminal inductor in parallel, and a third resonant part having a resonant frequency between a capacitor and an inductor connected in series to the primary terminal of the transformer.

The resonant frequencies may include a serial resonant frequency of a first resonant part having an inductor and a capacitor connected in series to each other in the approximated single mode equivalent model for modeling the mechanical characteristics of the transducer, a parallel resonant frequency by the second resonant part, and a serial resonant frequency by the third resonant part.

The impedance matching circuit may be acquired by deriving a constraint for its component values when an impedance matching of the transducer is performed in acoustic and ultrasonic wave bands, and constructing a fitness function to control the positions and the intervals of the frequencies, at which reactance components of the transducer become zero, for enhancement of bandwidth and power factor characteristics, and obtaining the component values of the matching circuit by optimizing the fitness function.

The impedance matching method may include a constraint deriving step of deriving a constraint for its component values when an impedance matching of the transducer is performed in the acoustic and ultrasonic wave bands, and a matching circuit designing step of calculating the positions and the intervals of the frequencies, at which the reactance components become zero for an expansion of a bandwidth and an increase in a power factor value, and obtaining a fitness function and matching circuit component values.

In accordance with the detailed description, an impedance matching circuit which is minimized a reactance component of transducer and increased its power factor may allow the efficient driving in a broadband between a transmitter and a transducer in an active SONAR system, and have effects which are greatly contributing to enhancement of output power performance and detection performance of the active SONAR system.

From the perspective of design factors of an electrical driving unit, such as driving characteristic, protection against heat, power capacity, transmitting acoustic pressure level and the like, there are the effects that a driving voltage control and leakage current minimization of the transducer may be allowed, and the physical size of matching circuit components may be minimized by using a turn ratio of a transformer. Also, a fabrication of unnecessary real hardware can be minimized and fabrication costs and time can be reduced when active sonar devices are produced.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A illustrates magnitude values of the impedance according to the frequency, and FIG. 1B illustrates phase values of the impedance according to the frequency;

FIG. 3A illustrates impedance magnitude values according to the frequency and FIG. 3B illustrates impedance phase values according to the frequency;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
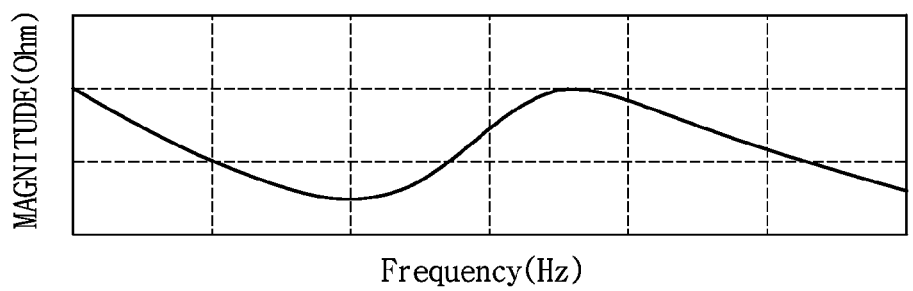
FIGS. 1A and 1B are views illustrating impedance characteristics of a single-mode transducer according to a frequency in accordance with the present disclosure. Specifically.
Figure 1B:
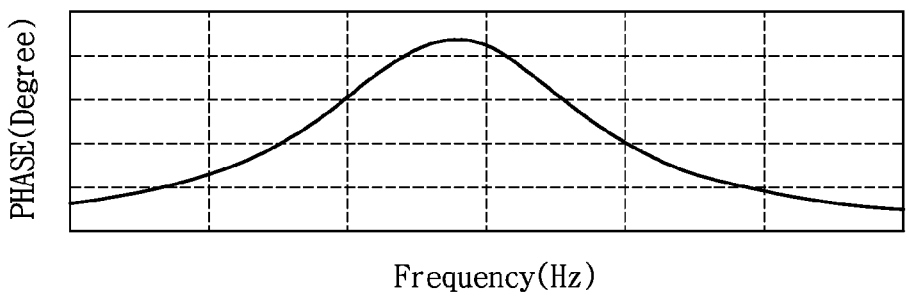

Hereinafter, description will be given in detail of an active sonar system and an impedance matching method in accordance with one exemplary embodiment. FIG. 1 illustrates impedance characteristics of a single-mode transducer 120 according to the frequencies in the acoustic and ultrasonic wave bands in accordance with the present disclosure. FIG. 1A illustrates magnitude values of the impedance according to the frequency, and FIG. 1B illustrates phase values of the impedance according to the frequency. It can be understood that resonance is generated at the frequency adjacent to a peak value of the impedance phase of FIG. 1B, the number of resonances corresponds to the number of modes, and only one resonance is present due to the transducer 120 being in the single-mode.

Figure 2:
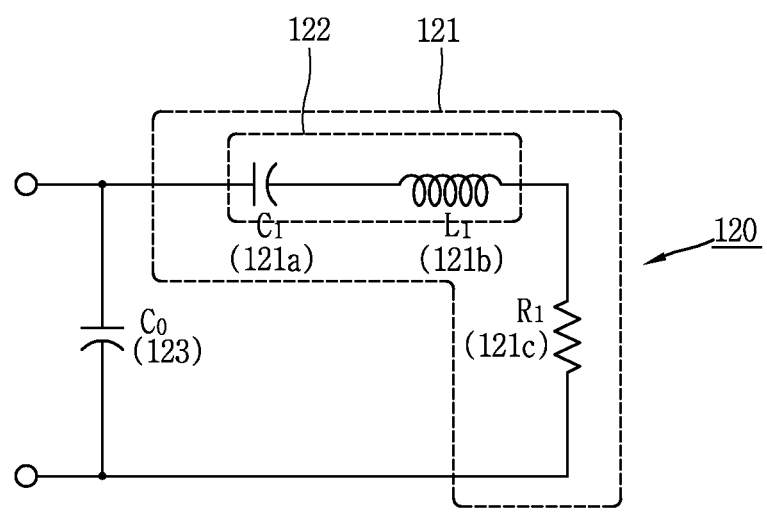
FIG. 2 is a circuit view illustrating impedance characteristics of the single-mode transducer as an electrical equivalent model using electrical lumped elements.

FIG. 2 is a circuit view illustrating an impedance characteristic of the single-mode transducer 120 as an electrical equivalent model consisting of electrical lumped elements.

The single-mode transducer 120 may include a resonant circuit 121, and an electric capacitor 123 indicating an electrical characteristic of the transducer 120. Here, the resonant circuit 121 may have a capacitor 121a and a inductor 121b indicating mechanical characteristics of the transducer 120, and a resistance 121c for receiving active power from a transmitter during the process of modeling single-mode impedance characteristics, which are all connected in series.

Figure 3A:
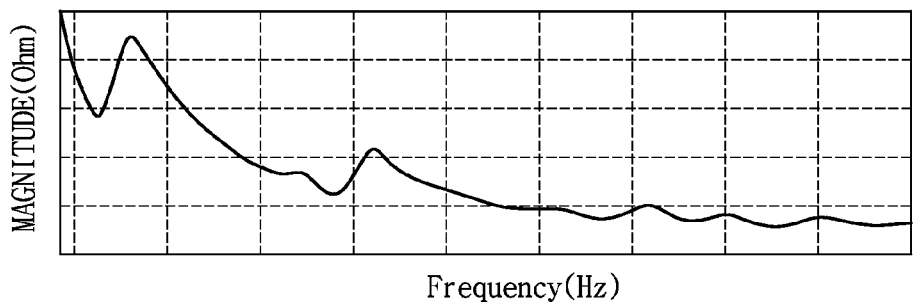
FIGS. 3A and 3B are views showing impedance characteristics of a multi-mode transducer according to a frequency in accordance with the present disclosure. Specifically.
Figure 3B:
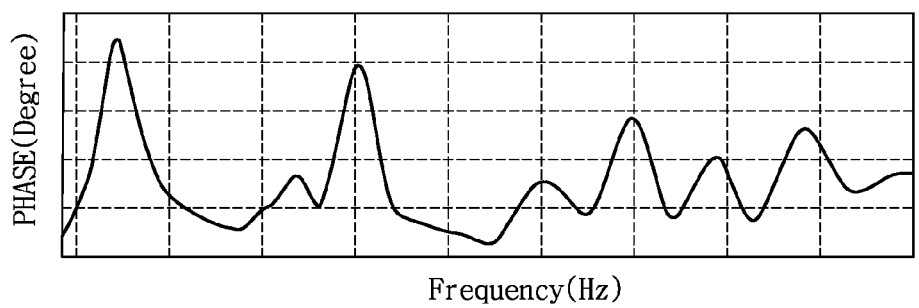

FIG. 3 is a view illustrating impedance characteristics of a multi-mode transducer 220 according to the frequency in accordance with the present disclosure. FIG. 3A illustrates impedance magnitude values according to the frequency and FIG. 3B illustrates impedance phase values according to the frequency. It can be understood that resonances are generated at frequencies adjacent to peak values of the impedance phase of FIG. 3B, and the number of resonances corresponds to the number of modes.

Figure 4:
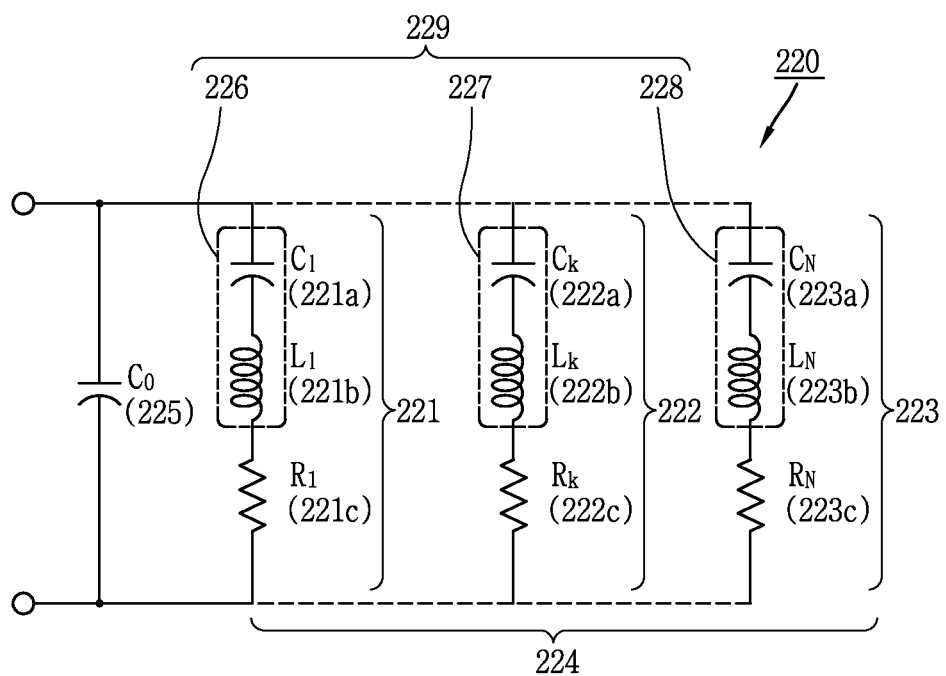
FIG. 4 is a circuit view illustrating impedance characteristics of the multi-mode transducer as an electrical equivalent model using electrical lumped elements.

FIG. 4 is a circuit view illustrating impedance characteristics of the multi-mode transducer 220 as an electrical equivalent model consisting of electrical lumped elements. The number of modes corresponds to the number of resonances of FIG. 3, and also corresponds to the number of stages of the equivalent model.

The multi-mode transducer 220 may include a capacitor 225 indicating an electrical characteristic of the transducer 220 and N resonant circuits 224 in which N stages corresponding to N resonant modes is connected in parallel, which indicate mechanical and acoustic characteristics of the transducer 220 during the process of modeling the multi-mode characteristic.

The N resonant circuits 224 may include: a first mode resonant circuit 221 having a first mode capacitor ($C_1$; 221a) and a first mode inductor ($L_1$; 221b) for a first resonant mode, and a first mode resistance ($R_1$; 221c) for receiving active power from a transmitter, which are all connected in series: a k-th mode resonant circuit 222 having a k-th mode capacitor ($C_k$; 222a) and a k-th mode inductor ($L_k$; 222b) for a k-th resonant mode, and a k-th mode resistance ($R_k$; 222c) for receiving active power from a transmitter, which are all connected in series; and an N-th mode resonant circuit 223 having an N-th mode capacitor ($C_N$; 223a) and an N-th mode inductor ($L_N$; 223b) for an N-th resonant mode, and an N-th mode resistance ($R_N$; 223c) for receiving active power from a transmitter, which are all connected in series.

Figure 5:
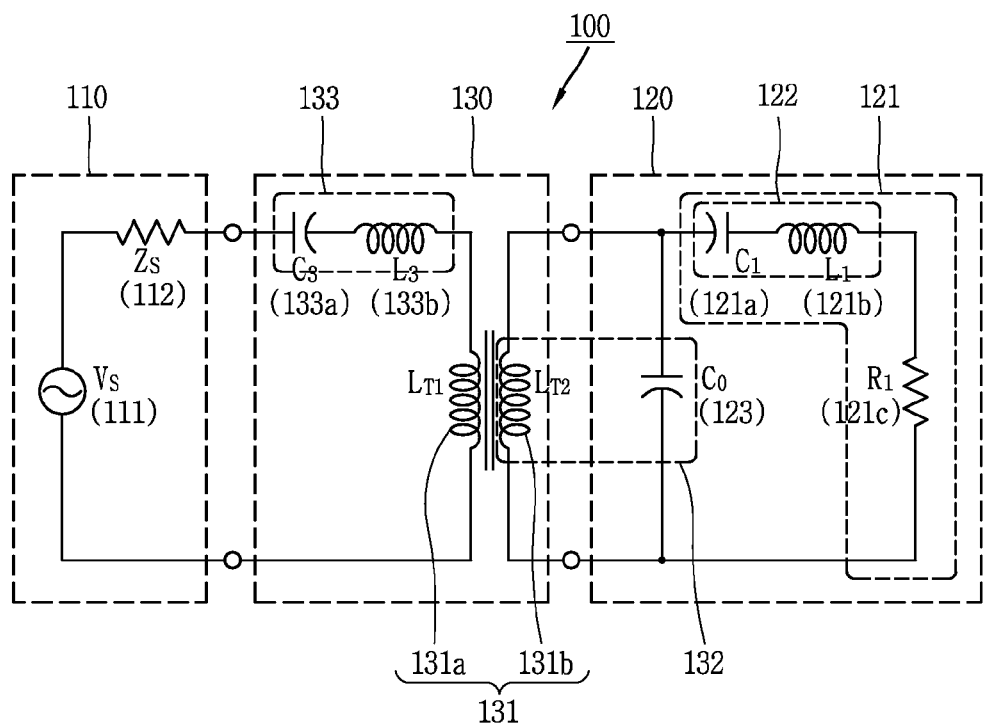
FIG. 5 is a circuit view illustrating a transmitting unit of an active sonar system including the single-mode transducer as an electrical equivalent model in accordance with the present disclosure.

FIG. 5 is a circuit view illustrating a transmitting unit 100 of an active sonar system including the single-mode transducer 120 as an electrical equivalent model in accordance with the present disclosure. The transmitting unit 100 of the active sonar system may include a transmitter 110, a transducer 120, and an impedance matching circuit 130.

The transmitter 110 may be modeled as an input power source 111 for supplying power, and an input impedance 112 corresponding to an internal resistance of the input power source 111.

The transducer 120 may convert an electrical signal of the transmitter 110, which is applied via the impedance matching circuit 130, into acoustic wave or external acoustic wave into an electrical signal.

The transducer 120 may include a capacitor 123 indicating an electrical characteristic of the transducer 120, and a resonant circuit 121, which includes a first resonant part 122 having a capacitor 121a and an inductor 121b indicating mechanical characteristics of the transducer 120 during the process of modeling single-mode impedance characteristics, and a resistance 121c for receiving active power from a transmitter. Here, the resonant circuit 121 may be connected in series to the resistance 121c.

The impedance matching circuit 130 is a circuit located between the transmitter 110 and the transducer 120 to transfer power from the transmitter 110 to the transducer 120 with high efficiency.

The impedance matching circuit 130 may include: a transformer 131 having a primary terminal and a secondary terminal to increase or decrease the secondary terminal voltage with respect to the primary terminal voltage; a second resonant part 132 having a resonant frequency by a secondary terminal inductor ($L_{T2}$; 131b) of the transformer 131 and the capacitor 123 connected to the secondary terminal inductor ($L_{T2}$; 131b) in parallel; and a third resonant part 133 having a resonant frequency between an inductor ($L_3$; 133b) and a capacitor ($C_3$; 133a) both connected to the primary terminal of the transformer 131 in series.

With the presence of the transformer 131, the impedance matching circuit 130 may be allowed to control a driving voltage of the transducer 120 and minimize a current leakage. In addition, the impedance matching circuit 130 having the transformer 131 may be allowed for physical size reduction of its components using a turn ratio between the primary terminal inductor 131a and the secondary terminal inductor 131b.

The resonant frequency by the transducer 120 may correspond to a serial resonant frequency of the first resonant part 122 in which the capacitor 121a and the inductor 121b are connected to each other in series for modeling the mechanical characteristics of the transducer 120. The resonant frequency between the transducer 120 and the impedance matching circuit 130 may correspond to a parallel resonant frequency by the second resonant part 132. The resonant frequency by the impedance matching circuit 130 may correspond to a serial resonant frequency by the third resonant part 133.

The equivalent model of FIG. 2 may be acquired from the actual impedance data of the single-mode transducer of FIG. 1. And, the resonant frequencies of the transducer 120 and the impedance matching circuit 130 or a resonant frequency between the transducer 120 and the impedance matching circuit 130 may match each other using the acquired equivalent model of FIG. 2. The positions and the intervals of the frequencies at which reactance components of the transducer 120 connected with the impedance matching circuit 130 become zero may be controlled, in order to extend a bandwidth and increase a power factor value in acoustic and ultrasonic wave bands. The power factor value, which is defined as a cosine value for a phase difference between voltage and current, which are outputted upon driving the transducer 120, may be expressed by the following Equation 1.

$$p.f. = \cos\theta = \frac{P}{|V||I|} \qquad \text{[Equation 1]}$$

where |V| and |I| denote levels of voltage and current, P denotes active power, which may be expressed by multiplying the voltage level, the current level and the cosine value for the phase difference $\theta$ between the voltage and the current. The phase difference $\theta$ between the voltage and the current may have a value in the range of $-90°$ to $90°$. Therefore, the power factor $\cos\theta$ may be expressed by a rate of the multiplied value of the voltage level and the current level to the active power.

The impedance matching circuit 130 may be designed to improve the power factor characteristic by minimizing the reactance components such that the phase difference between the voltage and the current of the transducer 120 can be reduced, for enhancing an output performance and a detection performance of the transmitter 110 of the active sonar system. That is, from the perspective of design factors of an electrical driving unit, such as driving characteristic, radiation of heat, electrical capacity, transmission acoustic pressure and the like, a fabrication of unnecessary actual models can be minimized and fabrication costs and time can be reduced when active sonar devices are produced.

Figure 6:
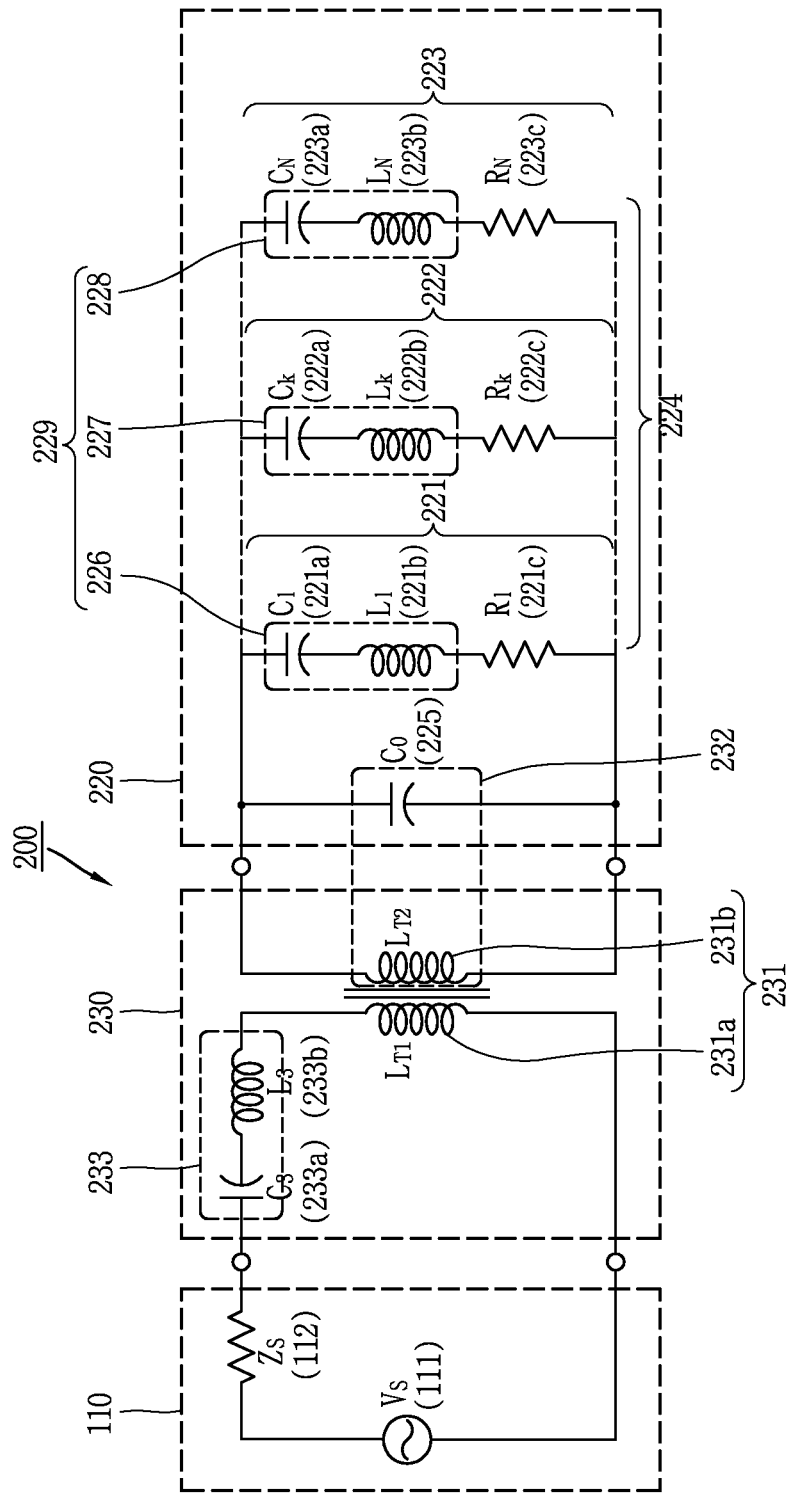
FIG. 6 is a circuit view illustrating a transmitting unit of an active sonar system including the multi-mode transducer as an electrical equivalent model in accordance with the present disclosure.

FIG. 6 is a circuit view illustrating a transmitting unit 200 of an active sonar system including the multi-mode transducer 220 as an electrical equivalent model in accordance with the present disclosure. The transmitting unit 200 of the active sonar system may include a transmitter 110, a transducer 220, and an impedance matching circuit 230.

The configurations of the transmitter 110 and the impedance matching circuit 230 are the same as those of the transmitter 110 and the impedance matching circuit 130 of the transmitting unit 100 of the active sonar system having the single-mode transducer 120 shown in FIG. 5, so detailed description thereof will be omitted. Here, the component values of the impedance matching circuit 230 of the transmitting unit 200 of the active sonar system having the multi-mode transducer 220 are different from the component values of the impedance matching circuit 130 of the transmitting unit 100 of the active sonar system having the single-mode transducer 120 because of the different configurations of the transducers.

The transducer 220 of FIG. 6 is also the same as the circuit view illustrating the impedance characteristic of the multi-mode transducer 220 as the electrical equivalent model using the electrical lumped elements shown in FIG. 4. Detailed description thereof will thusly be omitted.

The equivalent model of the multi-mode transducer 220 and the impedance matching circuit 230 of FIG. 6 may be indicated by being converted into the equivalent model of the single-mode transducer 120 and the impedance matching circuit 130 as shown in FIG. 5 at required resonant mode bands.

As an approximating method from the equivalent model of the multi-mode transducer 220 of FIG. 6 into an equivalent model of the single-mode transducer 120 of FIG. 5 at a corresponding resonant mode desired to match, when the corresponding mode desired to match is the first resonant mode, the mechanical-acoustic serial resonant circuits 222 and 223 except for the resonant circuit 221 are approximated into reactance components for the corresponding resonant frequency. The approximated inductive and capacitive reactance components 227 and 228 are included in the capacitor 225, which indicates an electrical characteristic of the transducer 220, thereby being finally approximated into the form of the single-mode equivalent model as shown in FIG. 5.

Figure 7:
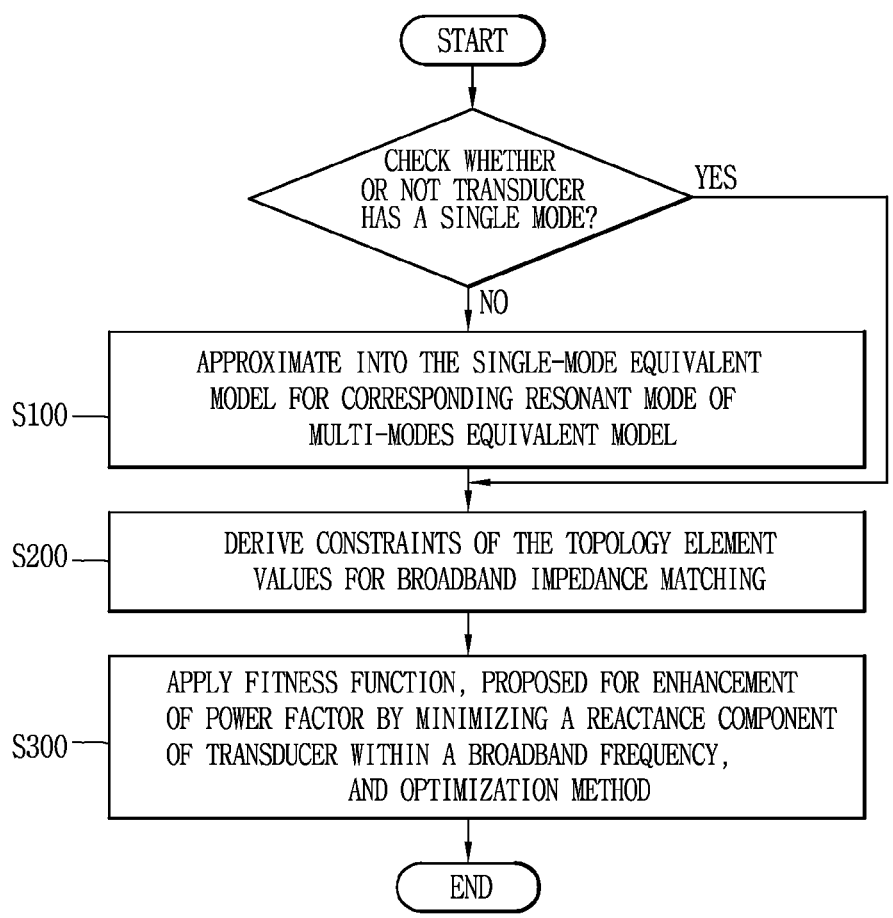
FIG. 7 is a flowchart showing an impedance matching method using an electrical equivalent model of a transducer, for driving underwater acoustic transducer in broadband and with high efficiency in accordance with the present disclosure.

FIG. 7 is a flowchart showing an impedance matching method using an electrical equivalent model of a transducer, for driving underwater acoustic transducer in broadband and with high efficiency in accordance with the present disclosure.

As illustrated in FIG. 7, parameter information related to an electrical equivalent circuit, which may represent impedance characteristics of a transducer desired to match, is used as input data. Here, when the transducer has multi-modes in a broadband, the transducer is approximated into a single-mode equivalent model (FIG. 2) with respect to a resonant mode corresponding to a frequency of interest (S100). Constraints of broadband impedance matching related to the component values of the transducer equivalent model and the matching circuit may be derived (S200). Afterwards, a fitness function, which is proposed to enhance a power factor characteristic by minimizing reactance components of a transducer matched in a broadband, and a nonlinear optimization method for the fitness function may be applied (S300), thereby obtaining component values of the matching circuit (S400).

Conditions that an imaginary component magnitude of an overall input impedance of the circuit FIG. 5, which includes the impedance matching circuit 130 obtained using the approximated transducer equivalent model, is minimized in a broadband, are closely linked to the positions and intervals of frequencies at which the imaginary components of the matched transducer become zero. Also, as aforementioned, the resonant frequencies between the inductor and the capacitor of each of the resonant parts 122, 132, 133 in FIG. 5 may be set to be equal to each other. By virtue of these characteristics, the constraints for the third capacitor 133a or the third inductor 133b of the impedance matching circuit may be derived for maximization of the power factor characteristic of the matched transducer as frequency elements, at which the reactance components of the matched transducer become zero (S200), have only real roots and used as boundary conditions for the estimation of the optimal element values (S400).

As one example, when the turn ratio N of a transformer is 1, if the transducer impedance is matched like FIG. 5, an equation for deriving a constraint for the third inductor 133b at which the imaginary components become zero may be defined as an equation for the resonant frequencies ($\omega_s$) of the first to third resonant parts, and expressed by the following equation 2.

$$\psi_s^4 + A(\omega_s, L_3, Q_m, G_m, C_0)\psi_s^2 + B(\omega_s, L_3, Q_m, G_m, C_0) = 0 \quad [\text{Equation 2}]$$

where, $$\psi_s = \left(\frac{\omega}{\omega_s} - \frac{\omega_s}{\omega}\right) \quad G_m = \frac{1}{R_1} \quad Q_m = \frac{1}{\omega_s R_1 C_1}$$

$$\omega_s = 1/\sqrt{L_1 C_1} = 1/\sqrt{L_{T2} C_0} = 1/\sqrt{L_3 C_3}$$

Also, A and B denote functions associated with $\omega_s$, $L_3$, $Q_m$, $G_m$, and $C_0$.

From Equation 2, a constraint for the third inductor 133b of the impedance matching circuit 130 in order for the matched transducer 120 to minimize the reactance components in a broadband may be derived, for example, by the following Formula 3.

$$\alpha(G_m, Q_m, C_0, \omega_s) \leq L_3 \leq \beta(G_m, Q_m, C_0, \omega_s) \quad [\text{Equation 3}]$$

where $\alpha$ and $\beta$ denote functions associated with $G_m$, $Q_m$, $C_0$ and $\omega_s$.

In addition to the boundary conditions for the component values, a frequency range may be defined by a maximum value ($\omega_{max}$) and a minimum value ($\omega_{min}$) of real-root frequencies, at which the imaginary components of the overall input impedance of the matched transducer become zero like Equation 2. A fitness function is constructed such that the power factor is close to 1 (phase component=0 or imaginary component=0) within a band for the impedance matching and an optimization method is applied with respect to the fitness function (S300) for obtaining optimal component values for the third capacitor ($C_3$; 133a) or the third inductor ($L_3$; 133b) (S400).

Examples of a mathematical expression of the fitness function F and a constraint for maximization of the power factor within the band for the impedance matching may be defined by the following Equation 4.

$$F = |1 - \min(\cos(\theta_z))| \quad [\text{Equation 4}]$$

$\omega_{min} \leq \Delta\omega \leq \omega_{max}$: Frequency Range $\alpha(G_m, Q_m, C_0, \omega_s) \leq L_3 \leq \beta(G_m, Q_m, C_0, \omega_s)$ The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An active Sound Navigation and Ranging (SONAR) system comprising:
   a transmitter comprising an input power source and an input impedance;
   a transducer configured to convert an electrical signal of the transmitter into an acoustic wave or convert the acoustic wave into the electrical signal; and
   an impedance matching circuit provided between the transmitter and the transducer and configured to transfer power from the transmitter to the transducer,
   wherein the impedance matching circuit comprises:
   a transformer having a primary terminal and a secondary terminal, the transformer being configured to increase or decrease a voltage of the secondary terminal with respect to a voltage of the primary terminal;
   a first resonant part comprising an inductor and a capacitor connected in series to each other, the first resonant part being configured to model the mechanical characteristics of the transducer;
   a second resonant part comprising: an inductor of the secondary terminal of the transformer; and a capacitor of the transducer, the capacitor being connected to the inductor of the secondary terminal in parallel; and
   a third resonant part comprising a capacitor and an inductor, the capacitor and the inductor being connected in series to the primary terminal of the transformer,
   wherein a bandwidth is expanded and a power factor value is increased in acoustic and ultrasonic wave bands, by matching resonant frequencies of the first resonant part, the second resonant part and the third resonant part through an electrical equivalent model corresponding to actual impedance data of the transducer, and also by controlling the positions and intervals of frequencies at which reactance components of the transducer become zero, wherein the reactance components comprises the impedance matching circuit; and
   wherein a resonant frequency of the first resonant part is a serial resonant frequency corresponding to a resonant frequency of the transducer, a resonant frequency of the second resonant part is a parallel resonant frequency corresponding to a resonant frequency of the transducer and the impedance matching circuit, and a resonant frequency of the third resonant part is a serial resonant frequency corresponding to a resonant frequency of the impedance matching circuit.

2. The system of claim 1, wherein the transducer is configured as the electrical equivalent model, in which a capacitor indicating an electrical characteristic of the transducer and lumped-element circuits having N stages indicating mechanical and acoustic characteristics of the transducer are connected in parallel to each other.

3. The system of claim 1, wherein the transducer is approximated into an equivalent model for a single resonant mode when the transducer has multi-modes.

4. The system of claim 1, wherein the impedance matching circuit is acquired by: deriving a constraint for component values of the impedance matching circuit, when an impedance matching of the transducer is performed in acoustic and ultrasonic wave bands; constructing a fitness function to control the positions and the intervals of the frequencies, at which the reactance components of the matched transducer become zero, for an expansion of the bandwidth and an increase in the power factor value; and obtaining the component values of the impedance matching circuit by optimizing the fitness function.

* * * * *